No. 625,171. Patented May 16, 1899.
M. A. LADD & G. N. GOVE.
PITMAN CONNECTION.
(Application filed Jan. 13, 1899.)
(No Model.)
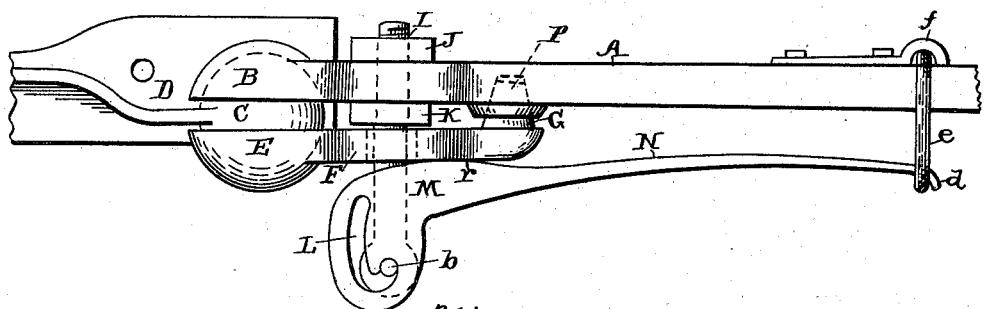
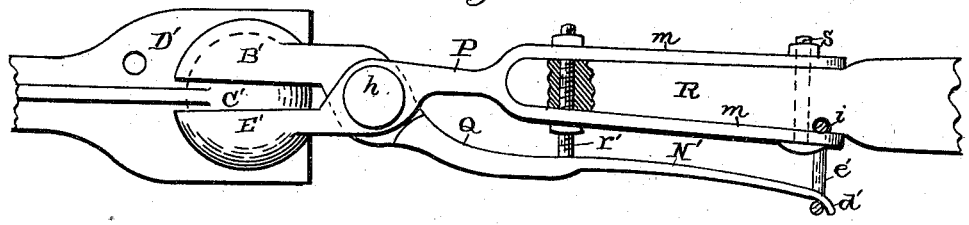
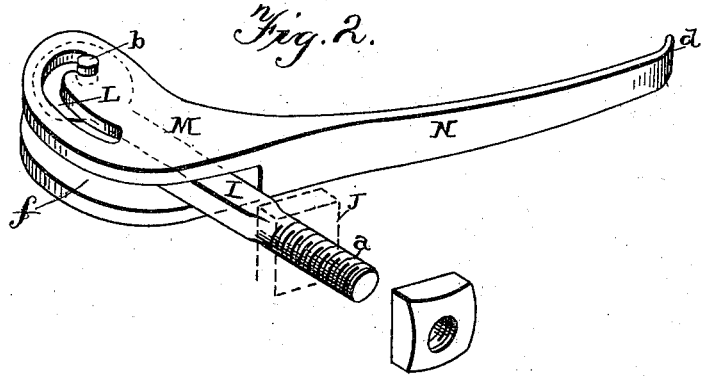
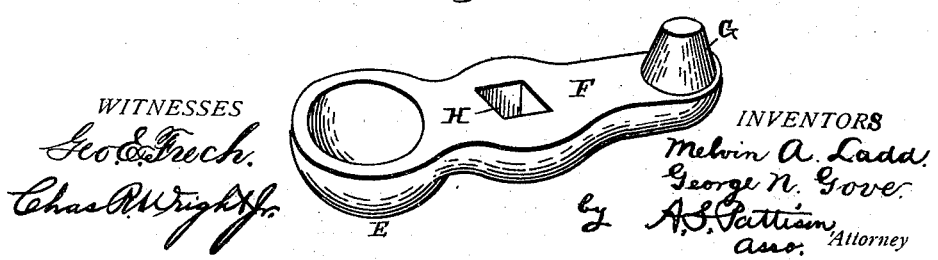
WITNESSES
INVENTORS
Melvin A. Ladd,
George N. Gove,
by A. S. Pattison,
Asso. Attorney

UNITED STATES PATENT OFFICE.

MELVIN A. LADD, OF GRAND ISLE, AND GEORGE N. GOVE, OF ESSEX, VERMONT.

PITMAN CONNECTION.

SPECIFICATION forming part of Letters Patent No. 625,171, dated May 16, 1899.

Application filed January 13, 1899. Serial No. 702,098. (No model.)

*To all whom it may concern:*

Be it known that we, MELVIN A. LADD, residing at Grand Isle, in the county of Grand Isle, and GEORGE N. GOVE, residing at Essex, in the county of Chittenden, State of Vermont, citizens of the United States, have invented certain new and useful Improvements in Pitman Connections; and we do hereby declare the following to be a full, clear, and exact description of the invention, such as will enable others skilled in the art to which it appertains to make and use the same.

Our invention relates to improvements in pitman connections, and pertains to a connection which is especially intended for use in connection with the cutter-blades of mowing-machines, though it is adapted for use for other analogous purposes in other mechanisms.

The object of our invention is to provide a simple, effective, and durable pitman connection wherein the wear of the bearings can be taken up at will and wherein an adjustable clamping member is provided with a yielding securing arm or member.

In the accompanying drawings, Figure 1 is a plan view of a connection embodying our invention. Fig. 2 is a detached perspective view of the clamping member and its supporting-hole. Fig. 3 is a detached perspective view of the movable member of the bearings. Fig. 4 is a plan view of a modification of our invention.

Referring to Figs. 1, 2, and 3, A is a pitman-rod carrying at one end a concaved member B, and F is a movable member supported by the pitman and carrying a coacting concaved member E, a ball-bearing C being between the concaved members B and E, the latter forming a ball-socket, as clearly illustrated in Fig. 1. The movable clamping member F is provided at its end opposite the concaved member or socket E with a projection G, adapted to fit in an opening, recess, or socket P, made in the pitman A. Intermediate the ends of this movable member F is an opening H, through which a rod or bolt I loosely passes. This bolt I is provided with a screw-threaded end *a*, which passes through an opening in the pitman A and receives at opposite sides of the pitman the nuts J and K, whereby the bolt I is capable of longitudinal adjustment through the pitman A, for a purpose to be presently described. The opposite and free end of this bolt I is provided with a transverse pin *b*, and supported upon the free end of the bolt I is a clamping member M. This clamping member is, in effect, a cam, as clearly illustrated, and is provided with a slot *f*, through which the bolt I passes, and permits the clamping member a turning movement thereon. This clamping member or cam M is provided with an approximately reversed-J-shaped slot L, which receives the pin *b*, as illustrated. This clamping member is provided with a yielding or spring arm N, and the clamping member is held in the position shown in Fig. 1 through the medium of a link *e*, which passes over its outer and free end, the said link being held by a keeper *f*, carried by the pitman A. The outer end or extremity of the yielding arm N is turned outward, as shown at *d*, for the purpose of preventing the link *e* from slipping therefrom.

In operation the clamping member or cam M engages the outer face of the movable member F of the ball-and-socket joint, as clearly shown in Fig. 1, and the yielding arm N is placed under tension by the link *e*, thus furnishing a yielding ball-and-socket bearing and a clamping member, which is held under spring tension, so that it will not rattle or jar loose. The clamping member or cam M engages the outer face of the movable member F at the point *r*, Fig. 1, preferably, which permits greater leverage at the socket or concaved member E for the purpose of yielding and yet hold the movable member sufficiently firm to prevent it from becoming detached from the ball.

Owing to the J-shaped slot L in the clamping member it is only necessary to release the yielding arm N thereof from the retaining-link *e* and turn the arm around at right angles to the pitman A, when the pin *b* can be moved in the slot J, thus furnishing sufficient room for the detachment of the movable member F, and consequently the detachment of the pitman from the ball-seat.

In Fig. 1 the device is shown with the ball C as attached or carried by the member or plate E, which is attached to the knife of the mower. However, it will be readily understood that this ball C may be attached or be a part of any appropriate part of any other mechanism instead of a knife-carrying member D without departing from the spirit and scope of our invention.

In Fig. 4 a modification of the yielding bearing and clamping member is shown. In this figure the pitman P is provided with two arms m, between which the pitman R, of wood or metal, is clamped by means of the bolts s and r'. The bolt r' is adjustable longitudinally through the member P of the pitman, as is the bolt I of the construction shown in Figs. 1 and 2, whereby the wear of the ball-and-socket joint can be readily taken up and whereby an adjustable fulcrum is formed for the clamping member. In this modification the clamping member Q is intermediately pivoted at the point h to the member P of the pitman and carries a concaved socket B', which, in conjunction with the concaved socket E', carried by the member P, serves, with the ball C', to form a ball-and-socket joint. In this instance the connection is shown as used in conjunction with a knife-carrying member or connection D' similar to that in Fig. 1, though this connection is adapted to be used in other mechanisms, as will be readily understood. The clamping member Q is provided with a yielding arm N', similar to that shown in Fig. 1, and a retaining-link e' is provided for the extremity of the yielding member. The extremity of the yielding member is turned outward, as shown at d', to prevent the retaining link or member e' slipping therefrom, and the pitman R is provided with an opening i to receive the link e' and retain it in position and permit it to swing freely for passing over the end of the spring-arm N' of the clamping member.

In the operation of both forms an adjustable member is provided for the spring-arm and the spring arm or member of the clamping element is placed under tension and held so by a retaining member, whereby a yielding ball-and-socket joint is provided; also, in both constructions through the medium of an adjustable member the clamping element or member is adapted to take up the wear of the bearing, as may be found necessary.

Having thus described our invention, what we claim, and desire to secure by Letters Patent, is—

1. A pitman connection comprising a bearing-socket, a movable member supported thereby having a coöperating bearing-socket, and a clamping member having a yielding retaining-arm, and a retaining member for said arm, substantially as described.

2. A pitman connection comprising a bearing-socket, a movable member having a coacting bearing-socket, a yielding clamping or holding member, and an adjustable member regulating the tension of the yielding clamping member, substantially as described.

3. A pitman connection comprising a bearing-socket, a movable member carried thereby having a bearing-socket, and a pivoted clamping member for the movable member having a yielding arm, and a retaining member for the yielding arm, substantially as described.

4. A pitman connection comprising a bearing-socket, a movable member having a bearing-socket, and a cam-shaped clamp for said movable member having a yielding arm, and a retaining member for the retaining-arm, substantially as described.

5. A pitman connection comprising a bearing-socket, a movable member having a coacting bearing-socket, the movable member having its opposite end connected with the pitman, a bolt passing loosely through the movable member and transversely through the pitman, and a yielding clamp carried by the projecting end of the bolt and engaging the movable bearing member, substantially as described.

6. A pitman connection comprising a bearing-socket, a movable member having a bearing-socket, the pitman having a clamp-support, and a cam-shaped clamp having a reversed-J-shaped slot, the clamp-support having a pin entering the slot, and a retaining member for the clamp, substantially as described.

In testimony whereof we do affix our signatures in presence of two witnesses.

MELVIN A. LADD.
GEORGE N. GOVE.

Witnesses:
W. ROBINSON,
J. H. DODDS.